United States Patent
Wang et al.

(10) Patent No.: US 11,597,048 B2
(45) Date of Patent: Mar. 7, 2023

(54) METHOD AND SYSTEM FOR OPTIMAL CONTROL OF ULTRA-PRECISION CUTTING

(71) Applicant: Guangdong University of Technology, Guangdong (CN)

(72) Inventors: Sujuan Wang, Guangdong (CN); Hailong Wang, Guangdong (CN); Xin Chen, Guangdong (CN); Senbin Xia, Guangdong (CN)

(73) Assignee: Guangdong University of Technology, Guangdong (CN)

( * ) Notice: Subject to any disclaimer, the term of this patent is extended or adjusted under 35 U.S.C. 154(b) by 428 days.

(21) Appl. No.: 16/814,274

(22) Filed: Mar. 10, 2020

(65) Prior Publication Data

US 2020/0290170 A1    Sep. 17, 2020

(30) Foreign Application Priority Data

Mar. 11, 2019    (CN) .......................... 201910178456.X

(51) Int. Cl.
*B23Q 17/20*    (2006.01)
*B23Q 17/24*    (2006.01)
*B23Q 17/10*    (2006.01)

(52) U.S. Cl.
CPC ............. *B23Q 17/20* (2013.01); *B23Q 17/10* (2013.01); *B23Q 17/2471* (2013.01)

(58) Field of Classification Search
CPC .... B23Q 17/10; B23Q 17/20; B23Q 17/2471; G05B 19/18; G05B 2219/36086
See application file for complete search history.

(56) References Cited

U.S. PATENT DOCUMENTS

| 5,377,116 A | * | 12/1994 | Wayne | ............... G05B 19/4097 706/904 |
| 6,348,110 B1 | * | 2/2002 | Evans | ..................... E21B 10/54 148/228 |
| 2006/0278308 A1 | * | 12/2006 | Shankar | ..................... B22F 9/04 148/513 |
| 2017/0335437 A1 | * | 11/2017 | Shyam | ..................... C22C 21/12 |
| 2018/0327890 A1 | * | 11/2018 | Shyam | ..................... C22C 21/18 |

OTHER PUBLICATIONS

Secotools, New Tools and Strategies Take on ISO S Materials, Sep. 2017 (Year: 2017).*

* cited by examiner

*Primary Examiner* — Kyle R Quigley
(74) *Attorney, Agent, or Firm* — Tutunjian & Bitetto, PC.

(57) ABSTRACT

A method and system for optimal control of ultra-precision cutting. The method for optimal control is based on time-precipitates-temperature characteristics of Al—Mg—Si series aluminum alloy, and includes first determining types of precipitates of machined materials, and establishing a Lifshitz-Slyozov-Wagner (LSW) model of each precipitate. A temperature range is determined corresponding to each precipitate according to the LSW model to obtain a comprehensive temperature range. A relation model is established between cutting parameters and a cutting temperature according to the LSW model. Finally the cutting parameters are optimized according to the comprehensive temperature range and the relation model, so that the cutting temperature is beyond the comprehensive temperature range to inhibit the generation of the precipitates.

9 Claims, 4 Drawing Sheets

METHOD AND SYSTEM FOR OPTIMAL CONTROL OF ULTRA-PRECISION CUTTING

TECHNICAL FIELD

The present invention relates to the field of ultra-precision cutting machining, and in particular, to a method and system for optimal control of ultra-precision cutting.

BACKGROUD

A chip volume of ultra-precision machining is in the micron level, and the surface roughness of a surface generated is in the nanometric level. The reduction of a chip volume and the plastic deformation of the workpiece surface materials make the heat transmission ratio in ultra-precision machining completely different from that in conventional machining, and the highest temperature occurs at a shearing surface At the same time, a rake angle and tip shape of a diamond cutter have great influence on the thermal effect in machining. As shown in FIG. 1, $h_1$ is Cutting depth, $h_2$ is Elastic height. Secondary zone (II) and tertiary zone (III), Heat sources: Plastic defomation Frictional contact.Primary zone (I), Heat source: Plastic deformation. As shown in FIG. 1, the increase in workpiece temperature during cutting is due to heat generated in the deformation zones II and III, and the two deformation zones mainly generate have mechanical and thermal loads to conduct heat to a machined surface. That is, heat is mainly conducted on the machined surface in the ultra-precision machining process. A cutter tip is made of diamond (with extremely high hardness), and thus in the ultra-precision diamond cutting machining process, the generated heat causes the surface temperature of the workpiece to rise. Some research results show that the cutting temperature in ultra-precision machining is as high as 250° C.-400° C. Therefore, for an Al—Mg—Si series aluminum alloy, the cutting-induced heat generation on the machined surface causes the precipitates.

Taking Al6061 of the Al—Mg—Si series aluminum alloy as an example, a large amount of dendritic segregation occurs in its as-cast alloy. The precipitates are mainly black $Mg_2Si$, white $\beta$-$Al_5FeSi$, $\beta$-$Al_5(FeMn)Si$ and a small amount of $\alpha$-$Al_{12}(FeMn)_3Si_2$, and the like. The hardness of these precipitates is higher than that of the aluminum alloy. Therefore, in the ultra-precision machining process, the relative movement between the diamond cutter and the workpiece the precipitates leave scratches on the machined surface, as shown in FIG. 2, thus reducing its surface integrity and increasing its surface roughness.

SUMMARY

The present invention aims to provide a method and system for optimal control of ultra-precision cutting to avoid strengthening phases induced scratches on a machined surface in ultra-precision machining of Al—Mg—Si series aluminum alloy so as to improve the surface integrity and reduce the surface roughness.

To achieve the foregoing objective, the present invention adopts the following solutions:

The present invention a method for optimal control of ultra-precision cutting, including the following steps of:

determining types of precipitates of machined materials, and establishing a Lifshitz-Slyozov-Wagner (LSW) model of each precipitate, the LSW model representing a relationship between sizes of the precipitates, heating temperature and heating time;

determining a temperature range corresponding to each precipitate according to the LSW model to obtain a comprehensive temperature range;

establishing a relation model between cutting parameters and a cutting temperature according to the LSW model; and optimizing the cutting parameters according to the comprehensive temperature range and the relation model, so that the cutting temperature is beyond the comprehensive temperature range to inhibit the generation of the precipitates.

Optionally, the determining types of precipitates of machined materials, and establishing an LSW model of each precipitate, the LSW model representing a relationship between sizes of the precipitates, a heating temperature and heating time specifically includes:

heating the machined materials, and adopting a scanning electron microscope and an energy spectrometer to obtain types of precipitates at different heating temperatures;

obtaining sizes of the precipitates corresponding to different heating temperatures and different heating time by adopting the scanning electron microscope and the energy spectrometer for each precipitate, and establishing an LSW model of each precipitate.

Optionally, the determining a temperature range corresponding to each precipitate according to the LSW model to obtain a comprehensive temperature range specifically includes:

determining a temperature range corresponding to each precipitate according to the LSW model; the temperature range corresponding to the precipitate being a temperature range in which the size of the precipitate is greater than a default threshold; and combining the temperature range corresponding to each precipitate to obtain a comprehensive temperature range.

Optionally, the establishing a relation model between cutting parameters and a cutting temperature according to the LSW model specifically includes:

establishing a cutting time prediction model;

determining cutting time corresponding to different cutting parameters according to the cutting time prediction model;

acquiring sizes of strengthening phases corresponding to different cutting parameters by using the energy spectrometer;

establishing a relation diagram of the sizes of the strengthening phases of the machined materials, the cutting parameters and the cutting time according to the cutting parameters, the sizes of the strengthening phases corresponding to the cutting parameters and the cutting time corresponding to the cutting parameters; and establishing a relation model between the cutting parameters and a cutting temperature according to the LSW model and the relation diagram.

Optionally, the cutting time prediction model is:

$$t=30\cdot(A\ COS((L-a_{ep})/L)+A\ COS(\sqrt{L^2-f^2/4}/L))/(\pi\cdot S)$$

where L is a gyration radius of a cutter, f is a feeding speed, S is a spindle speed and $a_{ep}$ is a cutting depth.

Optionally. the LSW model is:

$$\begin{cases} R^3 = R_0^3 + K\cdot t \\ K = \dfrac{8V_{at}^2 \gamma c_{ep}}{9}\cdot\dfrac{1}{k_B T}\cdot D = \dfrac{8V_{at}^2 \gamma c_{ep}}{9}\cdot\dfrac{1}{k_B T}\cdot \\ D_0 \exp\left(-\dfrac{Q}{k_B T}\right) = C\cdot\dfrac{1}{k_B T}\cdot\exp\left(-\dfrac{Q}{k_B T}\right) \end{cases}$$

where R is a radius of a strengthening phase, $R_0$ is an initial radius of a strengthening phase, C is a first constant, K is a heating time coefficient, T is a heating temperature, t is heating time, γ is interface energy of a strengthening phase, $V_{at}$ is an average volume of atoms, $C_{eq}$ is a homogeneous concentration of a strengthening phase, D is a diffusion coefficient of a strengthening phase, D=$D_0$ exp(−Q/$k_B$/T), Q is excitation energy, $k_B$ is a second constant, and $D_0$ is an initial diffusion coefficient of a strengthening phase.

A system for optimal control of ultra-precision cutting includes:

an LSW model establishing module, configured to determine types of precipitates of machined materials, and establish an LSW model of each precipitate, where the LSW model represents a relationship between sizes of the precipitates, a heating temperature and heating time;

a comprehensive temperature range determining module, configured to determine a temperature range corresponding to each precipitate according to the LSW model to obtain a comprehensive temperature range;

a relation model establishing module, configured to establish a relation model between cutting parameters and a cutting temperature according to the LSW model; and a cutting parameter optimization module, configured to optimize the cutting parameters according to the comprehensive temperature range and the relation model, so that the cutting temperature is beyond the comprehensive temperature range to inhibit the generation of the precipitates.

Optionally, the LSW model establishing module specifically includes:

a precipitate type determining submodule, configured to heat the machined materials, and adopt a scanning electron microscope and an energy spectrometer to obtain types of precipitates at different heating temperatures; and an LSW model establishing submodule, configured to obtain sizes of the precipitates corresponding to different heating temperatures and different heating time by adopting the scanning electron microscope and the energy spectrometer for each precipitate, and establish an LSW model of each precipitate.

Optionally, the comprehensive temperature range determining module specifically includes:

a temperature range determining submodule, configured to determine a temperature range corresponding to each precipitate according to the LSW model, where the temperature range corresponding to the precipitate is a temperature range in which the size of the precipitate is greater than a default threshold; and a comprehensive temperature range determining submodule, configured to combine the temperature range corresponding to each precipitate to obtain a comprehensive temperature range.

Optionally, the relation model establishing module specifically includes:

a cutting time prediction model establishing submodule, configured to establish a cutting time prediction model;

a cutting time prediction submodule, configured to determine cutting time corresponding to different cutting parameters according to the cutting time prediction model;

a strengthening phase size acquisition module, configured to acquire sizes of strengthening phases corresponding to different cutting parameters by using the energy spectrometer;

a relation model establishing submodule, configured to establish a relation diagram of the sizes of the strengthening phases of the machined materials, the cutting parameters and the cutting time according to the cutting parameters, the sizes of the strengthening phases corresponding to the cutting parameters and the cutting time corresponding to the cutting parameters; and a relation model establishing submodule, configured to establish a relation model between cutting parameters and a cutting temperature according to the LSW model and the relation diagram.

According to specific embodiments provided in the present invention, the present invention discloses the following technical effects.

The present invention discloses a method and system for optimal control of ultra-precision cutting. The method for optimal control is based on thermal benefit characteristics of Al—Mg—Si series aluminum alloy, and includes the steps of first determining types of precipitates of machined materials, and establishing a Lifshitz-Slyozov-Wagner (LSW) model of each precipitate; then determining a temperature range corresponding to each precipitate according to the LSW model to obtain a comprehensive temperature range; establishing a relation model between cutting parameters and a cutting temperature according to the LSW model; finally optimizing the cutting parameters according to the comprehensive temperature range and the relation model, so that the cutting temperature is beyond the comprehensive temperature range to inhibit the generation of the precipitates. According to the present invention, the problems that in the ultra-precision machining process, cutting heat causes the generation of precipitates of machined materials, and scratches are left on the machined surface since the hardness of the precipitates is higher than that of the machined materials, thus affecting the integrity of the machined surface and causing the quality of the machined surface to drop are solved.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

DESCRIPTION OF THE EMBODIMENTS

Al—Mg—Si series aluminum alloys belong to thermally-treatable reinforced aluminum alloys, including Al6061, Al6063, and the like. Al6061 has an elastic modulus of about 69.7 GPa and a tensile elastic modulus of about 68.3 GPa, and is a light material widely used in aviation, aerospace, automobile and other fields. This alloy has good comprehensive mechanical properties, good machinability, large plastic deformation and strong corrosion resistance. The strength of the alloy can be greatly improved after aging treatment. Because Al6061 has good comprehensive mechanical properties and good machinability, Al6061 is often used as an ultra-precision machining material for ultra-precision machining research.

In the actual ultra-precision cutting process, the diamond cutter contacts with the workpiece, and materials are removed according to set machining parameters (a cutting depth and a feeding speed), consumed power is converted into heat energy, and heat generated by cutting is transferred through a cutter, cutter chips and workpiece materials. During ultra-precision cutting, the increase in workpiece temperature is due to heat generated by deformed zones II and III, and the two deformed zones mainly generate mechanical and thermal loads. The heat is related to machining parameters. Therefore, controlling the machining parameters can change the cutting heat in the cutting process, thus controlling the precipitation of strengthening phases of Al—Mg—Si series aluminum alloys.

The present invention aims to provide a method and system for optimal control of ultra-precision cutting so as to avoid scratches on a machined surface caused by strengthening phases generated in a ultra-precision machining process of an Al—Mg—Si series aluminum alloy, improve the integrity of the machined surface and reduce the roughness of the machined surface.

In order to make the above objectives, features, and advantages of the present invention more easily understandable, the present invention is further described in detail with reference to the accompanying drawings and the specific implementations.

Embodiment 1

Embodiment 1 of the present invention provides a method for optimal control of ultra-precision cutting.

Figure 1:
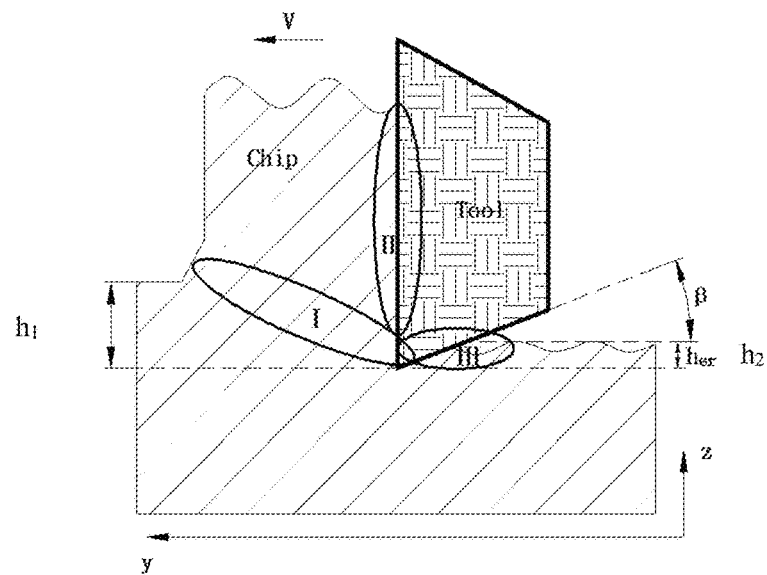
FIG. 1 is an analysis diagram of three heat sources in ultra-precision cutting process.
Figure 2:
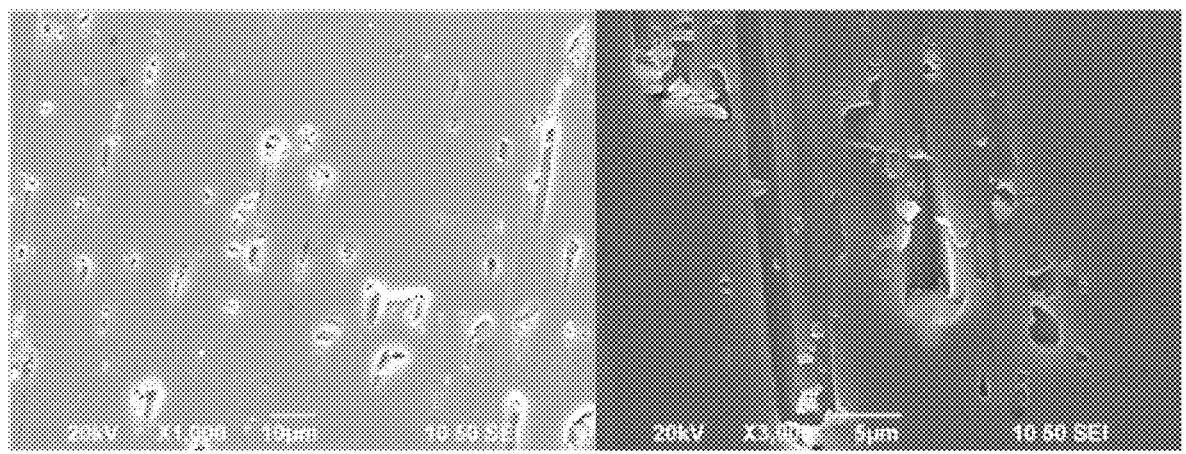
FIG. 2 is a schematic diagram of scratches on the surface of an ultra-precision workpiece.
Figure 3:
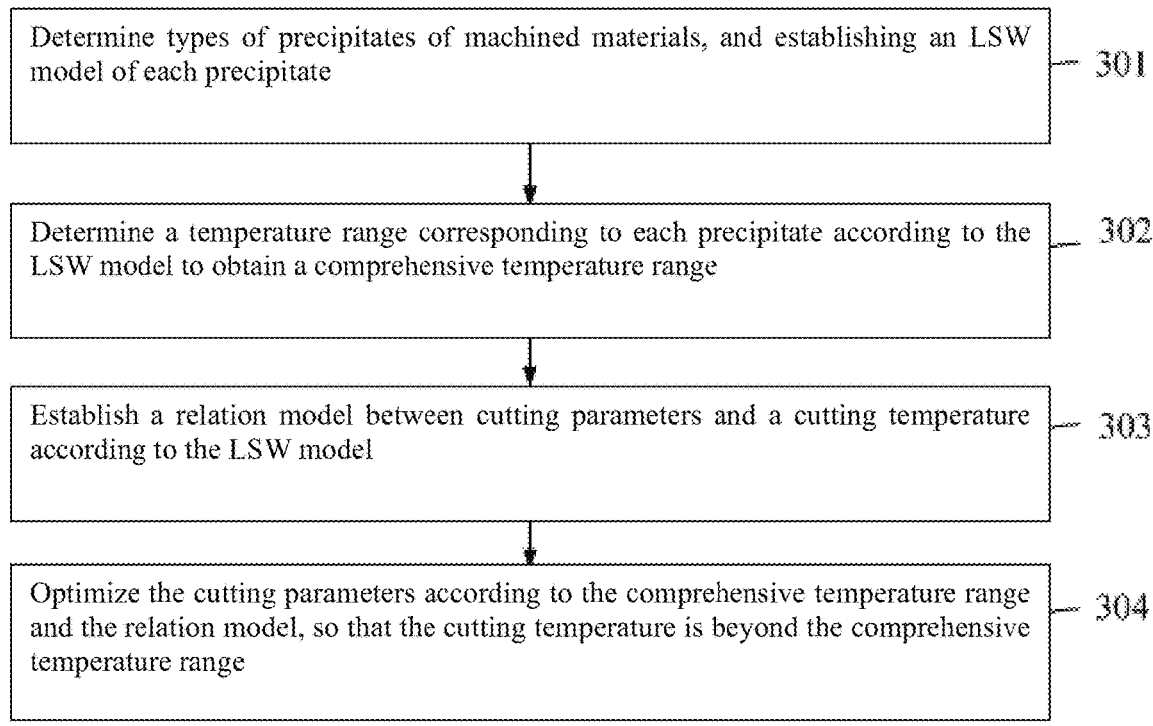
FIG. 3 is a flowchart of a method for optimal control of ultra-precision cutting provided by the present invention.

As shown in FIG. 3, the method for optimal control includes the following steps.

Step 301: Determine types of precipitates of machined materials, and establishing an LSW model of each precipitate, where the LSW model represents a relationship between sizes of the precipitates, a heating temperature and heating time. Step 302: Determine a temperature range corresponding to each precipitate according to the LSW model to obtain a comprehensive temperature range. Step 303: Establish a relation model between cutting parameters and a cutting temperature according to the LSW model. Step 304: Optimize the cutting parameters according to the comprehensive temperature range and the relation model, so that the cutting temperature is beyond the comprehensive temperature range to inhibit the generation of the precipitates.

Embodiment 2

Embodiment 2 of the present invention provides a preferred implementation of a method for optimal control of ultra-precision cutting, but the implementation of the present invention is not limited to the implementation defined in Embodiment 2 of the present invention.

Figure 4:
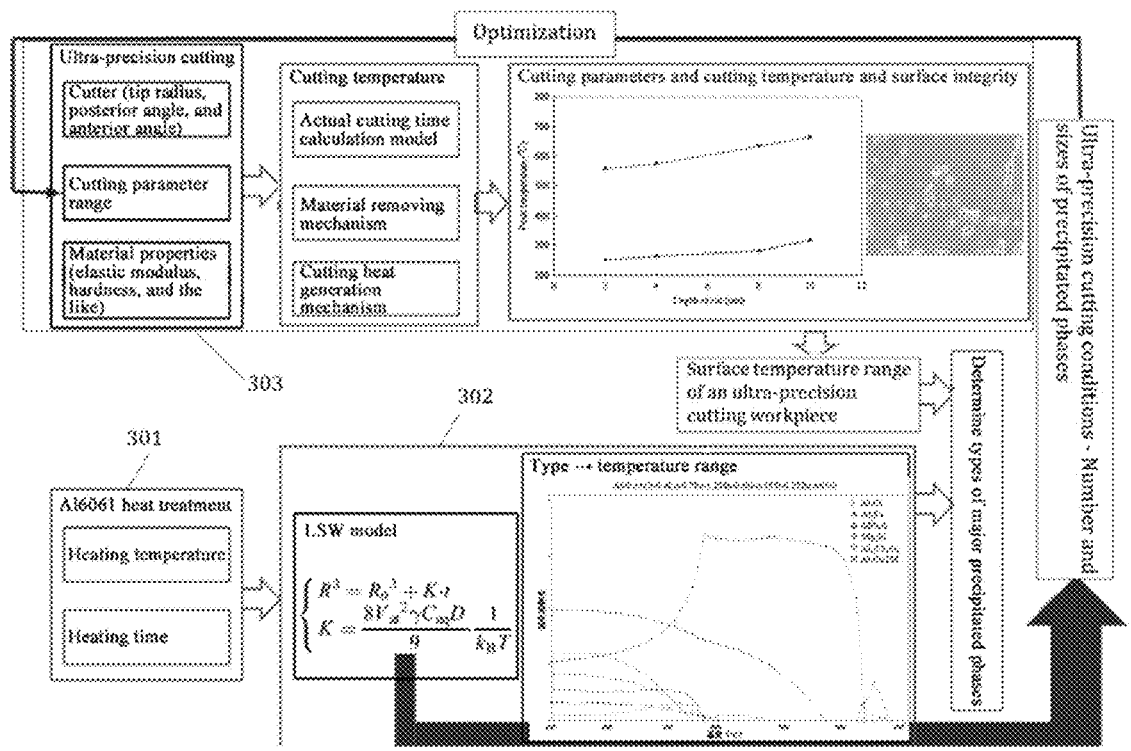
FIG. 4 is a flowchart of a preferred embodiment of a method for optimal control of ultra-precision cutting provided by the present invention.
Figure 5:
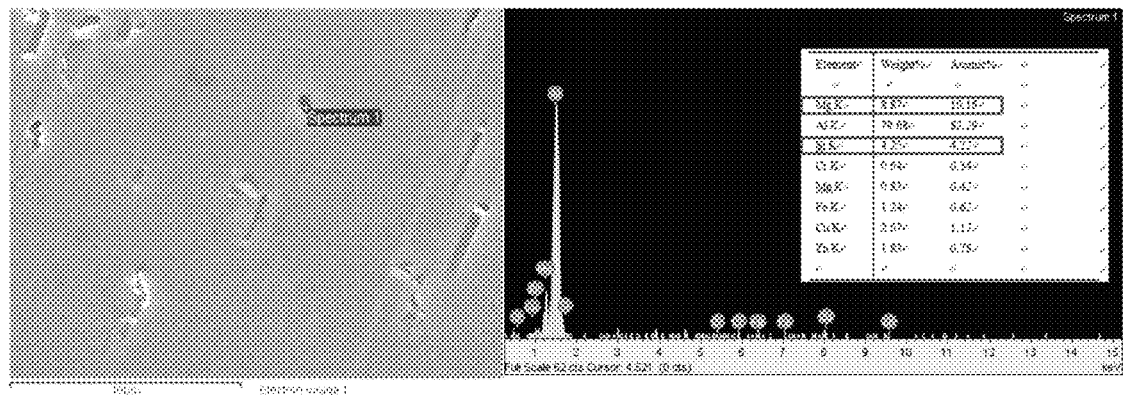
FIG. 5 is a schematic diagram of a black precipitate on the surface of a machined workpiece according to the present invention when a cut material is aluminum 6061.
Figure 6:
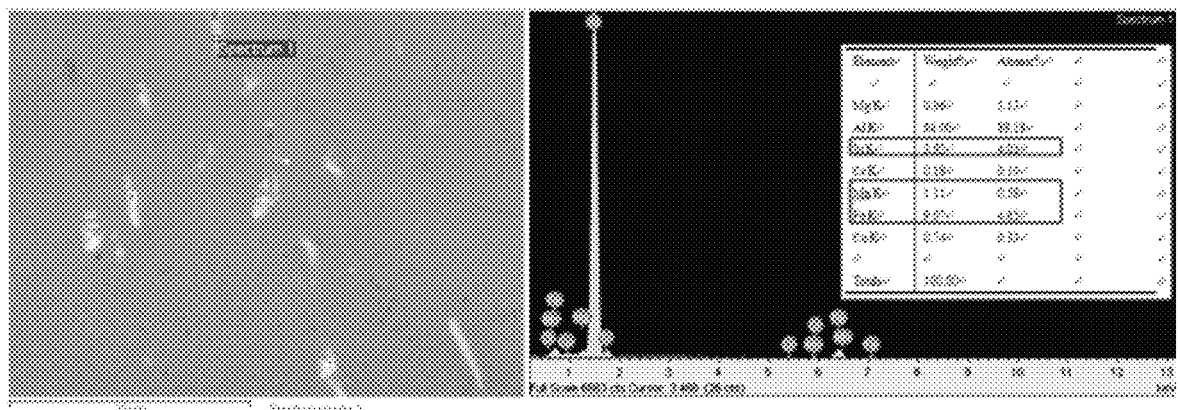
FIG. 6 is a schematic diagram of a white precipitate on the surface of a machined workpiece according to the present invention when a cut material is aluminum 6061.

As shown in FIG. 4, the LSW model in step 301 represents a relationship between sizes of the precipitates, a heating temperature and heating time, specifically including: heating the machined materials, and adopting a scanning electron microscope and an energy spectrometer to obtain types of precipitates at different heating temperatures, where the main precipitates of the machined material 6061 are as shown in FIGS. 5 and 6, which are black $Mg_2Si$ and white $\beta\text{-}Al_5(FeMn)Si$ respectively; and obtaining sizes of the precipitates corresponding to different heating temperatures and different heating time by adopting the scanning electron microscope and the energy spectrometer for each precipitate, and establishing an LSW model of each precipitate.

The determining a temperature range corresponding to each precipitate according to the LSW model to obtain a comprehensive temperature range in step 302 specifically includes: determining a temperature range corresponding to each precipitate according to the LSW model; the temperature range corresponding to the precipitate being a temperature range in which the size of the precipitate is greater than a default threshold; and combining the temperature range corresponding to each precipitate to obtain a comprehensive temperature range.

The establishing a relation model between cutting parameters and a cutting temperature according to the LSW model in step 303 specifically includes: establishing a cutting time prediction model; determining cutting time corresponding to different cutting parameters according to the cutting time prediction model; acquiring sizes of strengthening phases corresponding to different cutting parameters by using the energy spectrometer; establishing a relation diagram of the sizes of the strengthening phases of the machined materials, the cutting parameters and the cutting time according to the cutting parameters, the sizes of the strengthening phases corresponding to the cutting parameters and the cutting time corresponding to the cutting parameters; and establishing a relation model between the cutting parameters and a cutting temperature according to the LSW model and the relation diagram.

The cutting time prediction model is:

$$t = 30 \cdot (A\ \text{COS}((L-a_{ep})/L) + A\ \text{COS}(\sqrt{L^2-f^2/4}/L))/(\pi \cdot S)$$

where L is a gyration radius of a cutter, f is a feeding speed, S is a spindle speed and $a_{ep}$ is a cutting depth.

The LSW model is:

$$\begin{cases} R^3 = R_0^3 + K \cdot t \\ K = \frac{8V_{at}^2 \gamma c_{ep}}{9} \cdot \frac{1}{k_B T} \cdot D = \frac{8V_{at}^2 \gamma c_{ep}}{9} \cdot \frac{1}{k_B T} \cdot \\ D_0 \exp\left(-\frac{Q}{k_B T}\right) = C \cdot \frac{1}{k_B T} \cdot \exp\left(-\frac{Q}{k_B T}\right) \end{cases}$$

where R is a radius of a strengthening phase, $R_0$ is an initial radius of a strengthening phase, C is a first constant, K is a heating time coefficient, T is a heating temperature, t is heating time, $\gamma$ is interface energy of a strengthening phase, Vat is an average volume of atoms, $C_{eq}$ is a homogeneous concentration of a strengthening phase, D is a diffusion coefficient of a strengthening phase, $D = D_0\ \exp(-Q/k_B T)$, Q is excitation energy, $k_B$ is a second constant, and $D_0$ is an initial diffusion coefficient of a strengthening phase.

Embodiment 3

Embodiment 3 of the present invention provides a system for optimal control of ultra-precision cutting.

Figure 7:
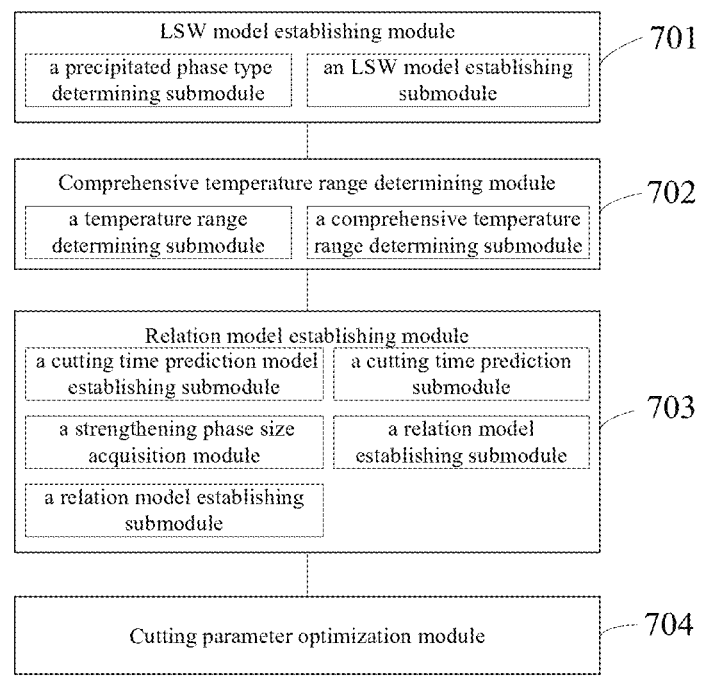
FIG. 7 is a schematic structural diagram of a system for optimal control of ultra-precision cutting provided by the present invention.

As shown in FIG. 7, the system for optimal control includes: an LSW model establishing module 701, configured to determine types of precipitates of machined materials, and establish an LSW model of each precipitate, where the LSW model represents a relationship between sizes of the precipitates, a heating temperature and heating time; a comprehensive temperature range determining module 702, configured to determine a temperature range corresponding to each precipitate according to the LSW model to obtain a comprehensive temperature range; a relation model establishing module 703, configured to establish a relation model between cutting parameters and a cutting temperature according to the LSW model; and a cutting parameter optimization module 704, configured to optimize the cutting parameters according to the comprehensive temperature range and the relation model, so that the cutting temperature is beyond the comprehensive temperature range to inhibit the generation of the precipitates.

Embodiment 4

Embodiment 4 of the present invention provides a preferred implementation of a system for optimal control of ultra-precision cutting, but the implementation of the present invention is not limited to the implementation defined in Embodiment 4 of the present invention.

the LSW model establishing module 701 specifically includes: a precipitate type determining submodule, configured to heat the machined materials, and adopt a scanning electron microscope and an energy spectrometer to obtain types of precipitates at different heating temperatures; and an LSW model establishing submodule, configured to obtain sizes of the precipitates corresponding to different heating temperatures and different heating time by adopting the scanning electron microscope and the energy spectrometer for each precipitate, and establish an LSW model of each precipitate.

The comprehensive temperature range determining module 702 specifically includes: a temperature range determining submodule, configured to determine a temperature range corresponding to each precipitate according to the LSW model, where the temperature range corresponding to the precipitate is a temperature range in which the size of the precipitate is greater than a default threshold; and a comprehensive temperature range determining submodule, configured to combine the temperature range corresponding to each precipitate to obtain a comprehensive temperature range.

The relation model establishing module 703 specifically includes: a cutting time prediction model establishing submodule, configured to establish a cutting time prediction model; a cutting time prediction submodule, configured to determine cutting time corresponding to different cutting parameters according to the cutting time prediction model; a strengthening phase size acquisition module, configured to acquire sizes of strengthening phases corresponding to different cutting parameters by using the energy spectrometer; a relation model establishing submodule, configured to establish a relation diagram of the sizes of the strengthening phases of the machined materials, the cutting parameters and the cutting time according to the cutting parameters, the sizes of the strengthening phases corresponding to the cutting parameters and the cutting time corresponding to the cutting parameters; and a relation model establishing submodule, configured to establish a relation model between cutting parameters and a cutting temperature according to the LSW model and the relation diagram.

The "module" and the "submodule" are computer software module.

According to the present invention, the problems that in the ultra-precision machining process, cutting heat causes the generation of precipitates of machined materials, and scratches are left on the machined surface since the hardness of the precipitates is higher than that of the machined materials, thus affecting the integrity of the machined surface and causing the quality of the machined surface to drop are solved.

Each embodiment of the present specification is described in a progressive manner, each embodiment focuses on the difference from other embodiments, and the same and similar parts between the embodiments may refer to each other. Since the system disclosed in the embodiment corresponds to the method disclosed in the embodiment, the description is relatively simple. For relevant information, reference is made to the description of the method.

In this paper, specific examples are applied to explain the principle and implementations of the present invention. The above embodiments are only used to help understand the method of the present invention and its core ideas. The described embodiments are only some rather than all of the embodiments. Based on the embodiments of the present invention, all other embodiments obtained by a person of ordinary skill in the art without creative labor fall within the protection scope of the present invention.

What is claimed is:

1. A method for optimal control of ultra-precision cutting, comprising:
    determining types of precipitates of machined materials, and establishing a Lifshitz-Slyozov-Wagner (LSW) model of each precipitate, the LSW model representing a relationship between sizes of the precipitates, a heating temperature and heating time;
    determining a temperature range corresponding to each precipitate according to the LSW model to obtain a comprehensive temperature range;
    establishing a relation model between cutting parameters and a cutting temperature according to the LSW model, comprising:
        establishing a cutting time prediction model, wherein the cutting time prediction model is:

$$t = 30 \cdot (A\cos((L-a_{ep})/L) + A\cos(\sqrt{L^2 - f^2/4}/L))/(\pi \cdot S)$$

wherein L is a gyration radius of a culter, f is a feeding speed, S is a spindle speed and $a_{ep}$ is a cutting depth;
        determining a cutting time corresponding to different cutting parameters according to the cutting time prediction model;
        acquiring sizes of strengthening phases corresponding to different cutting parameters by using an energy spectrometer;
        establishing a relation diagram of the sizes of the strengthening phases of the machines materials, the cutting parameters and the cutting time according to the cutting parameters, the sizes of the strengthening phases corresponding to the cutting parameters and the cutting time corresponding to the cutting parameters; and
        establishing a relation model between the cutting parameters and a cutting temperature according to the LSW model and the relation diagram;

optimizing the cutting parameters according to the comprehensive temperature range and the relation model; and controlling a cutter according to optimized cutting parameters so that the cutting temperature is beyond the comprehensive temperature range to inhibit the generation of the precipitates.

2. The method for optimal control of ultra-precision cutting according to claim 1, wherein the determining types of precipitates of machined materials, and establishing an LSW model of each precipitate, comprises:

heating the machined materials, and adopting a scanning electron microscope and an energy spectrometer to obtain types of precipitates at different heating temperatures; and obtaining sizes of the precipitates corresponding to different heating temperatures and different heating time by adopting the scanning electron microscope and the energy spectrometer for each precipitate and establishing the LSW model of each precipitate.

3. The method for optimal control of ultra-precision cutting according to claim 1, wherein the determining a temperature range corresponding to each precipitate according to the LSW model to obtain a comprehensive temperature range comprises:

determining a temperature range corresponding to each precipitate according to the LSW model; the temperature range corresponding to the precipitate being a temperature range in which the size of the precipitate is greater than a default threshold; and combining the temperature range corresponding to each precipitate to obtain a comprehensive temperature range.

4. The method for optimal control of ultra-precision cutting according to claim 1, wherein the LSW model is:

$$\begin{cases} R^3 = R_0^3 + K \cdot t \\ K = \frac{8V_{at}^2 \gamma c_{ep}}{9} \cdot \frac{1}{k_B T} \cdot D = \frac{8V_{at}^2 \gamma c_{ep}}{9} \cdot \frac{1}{k_B T} \cdot \\ D_0 \exp\left(-\frac{Q}{k_B T}\right) = C \cdot \frac{1}{k_B T} \cdot \exp\left(-\frac{Q}{k_B T}\right) \end{cases}$$

wherein R is a radius of a strengthening phase, $R_0$ is an initial radius of a strengthening phase, C is a first constant, K is a heating time coefficient, T is a heating temperature, t is heating time, γ is interface energy of a strengthening phase, $V_{at}$ is an average volume of atoms, $C_{eq}$ is a homogeneous concentration of a strengthening phase, D is a diffusion coefficient of a strengthening phase, $D=D_0 \exp(-Q/k_B T)$, Q is excitation energy, $k_B$ is a second constant, and $D_0$ is an initial diffusion coefficient of a strengthening phase.

5. The method for optimal control of ultra-precision cutting according to claim 2, wherein the LSW model is:

$$\begin{cases} R^3 = R_0^3 + K \cdot t \\ K = \frac{8V_{at}^2 \gamma c_{ep}}{9} \cdot \frac{1}{k_B T} \cdot D = \frac{8V_{at}^2 \gamma c_{ep}}{9} \cdot \frac{1}{k_B T} \cdot \\ D_0 \exp\left(-\frac{Q}{k_B T}\right) = C \cdot \frac{1}{k_B T} \cdot \exp\left(-\frac{Q}{k_B T}\right) \end{cases}$$

wherein R is a radius of a strengthening phase, Ro is an initial radius of a strengthening phase, C is a first constant, K is a heating time coefficient, T is a heating temperature, t is heating time, γ is interface energy of a strengthening phase, $V_{at}$ is an average volume of atoms, $C_{eq}$ is a homogeneous concentration of a strengthening phase, D is a diffusion coefficient of a strengthening phase, $D=D_0 \exp(-Q/k_B T)$, Q is excitation energy, $k_B$ is a second constant, and $D_0$ is an initial diffusion coefficient of a strengthening phase.

6. The method for optimal control of ultra-precision cutting according to claim 3, wherein the LSW model is:

$$\begin{cases} R^3 = R_0^3 + K \cdot t \\ K = \frac{8V_{at}^2 \gamma c_{ep}}{9} \cdot \frac{1}{k_B T} \cdot D = \frac{8V_{at}^2 \gamma c_{ep}}{9} \cdot \frac{1}{k_B T} \cdot \\ D_0 \exp\left(-\frac{Q}{k_B T}\right) = C \cdot \frac{1}{k_B T} \cdot \exp\left(-\frac{Q}{k_B T}\right) \end{cases}$$

wherein R is a radius of a strengthening phase, $R_0$ is an initial radius of a strengthening phase, C is a first constant, K is a heating time coefficient, T is a heating temperature, t is heating time, γ is interface energy of a strengthening phase, $V_{at}$ is an average volume of atoms, $C_{eq}$ is a homogeneous concentration of a strengthening phase, D is a diffusion coefficient of a strengthening phase, $D=D_0 \exp(-Q/k_B T)$, Q is excitation energy, $k_B$ is a second constant, and $D_0$ is an initial diffusion coefficient of a strengthening phase.

7. A system for optimal control of ultra-precision cutting, comprising:

an LSW model establishing module, configured to determine types of precipitates of machined materials, and establish an LSW model of each precipitate, wherein the LSW model represents a relationship between sizes of the precipitates, a heating temperature and heating time;

a comprehensive temperature range determining module, configured to determine a temperature range corresponding to each precipitate according to the LSW model to obtain a comprehensive temperature range;

a relation model establishing module, configured to establish a relation model between cutting parameters and a cutting temperature according to the LSW model, wherein the relation model establishing module comprises:

a cutting time prediction model establishing submodule, configured to establishing a cutting time prediction model, wherein the cutting time prediction model is:

$$t = 30 \cdot (A \cos((L - a_{ep})/L) + A \cos(\sqrt{L^2 - f^2/4}/L))/(\pi \cdot S)$$

wherein L is a gyration radius of a culter, f is a feeding speed, S is a spindle speed and $a_{ep}$ is a cutting depth;

a cutting time prediction submodule, configured to determine cutting time corresponding to different cutting parameters according to the cutting time prediction model;

a strengthening phase size acquisition module, configured to acquire sizes of strengthening phases corresponding to different cutting parameters by using an energy spectrometer;

a relation model establishing submodule, configured to establish a relation diagram of the sizes of the strengthening phases of the machines materials, the cutting parameters an the cutting time according to the cutting parameters, the sizes of the strengthening phases corresponding to the cutting parameters and the cutting time corresponding to the cutting parameters; and a relation model establishing submodule, configured to establish a relation model between cutting parameters and cutting temperature according to the LSW model and the relation diagram;

a cutting parameter optimization module, configured to optimize the cutting parameters according to the comprehensive temperature range and the relation model; and an output module, configured to output optimized cutting parameters;

wherein in a process of ultra-precision cutting, a cutter is controlled according to the optimized cutting parameters so that the cutting temperature is beyond the comprehensive temperature range to inhibit the generation of the precipitates.

8. The system for optimal control of ultra-precision cutting according to claim 7, wherein the LSW model establishing module comprises:

a precipitate type determining submodule, configured to heat the machined materials, and adopt a scanning electron microscope and an energy spectrometer to obtain types of precipitates at different heating temperatures; and an LSW model establishing submodule, configured to obtain sizes of the precipitates corresponding to different heating temperatures and different heating time by adopting the scanning electron microscope and the energy spectrometer for each precipitate, and establish an LSW model of each precipitate.

9. The system for optimal control of ultra-precision cutting according to claim 7, wherein the comprehensive temperature range determining module comprises:

a temperature range determining submodule, configured to determine a temperature range corresponding to each precipitate according to the LSW model, wherein the temperature range corresponding to the precipitate is a temperature range in which the size of the precipitate is greater than a default threshold; and a comprehensive temperature range determining submodule, configured to combine the temperature range corresponding to each precipitate to obtain a comprehensive temperature range.

* * * * *